(No Model.) 2 Sheets—Sheet 1.
J. D. SEAGRAVE & E. R. FULLER.
FIRE ESCAPE.
No. 286,644. Patented Oct. 16, 1883.
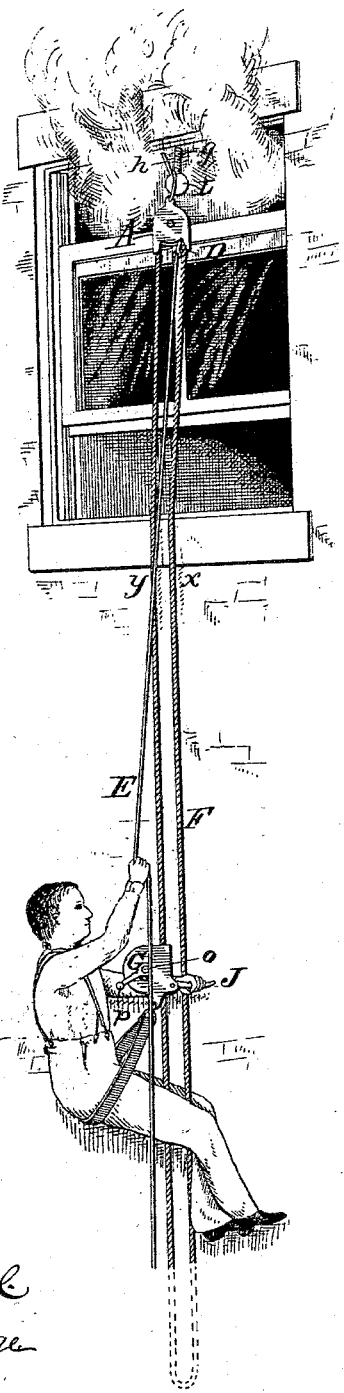
WITNESSES:
Jas. F. DuHamel
Walter S. Dodge
INVENTORS.
John D. Seagrave,
Eustis R. Fuller,
by Dodgeson,
Attys.

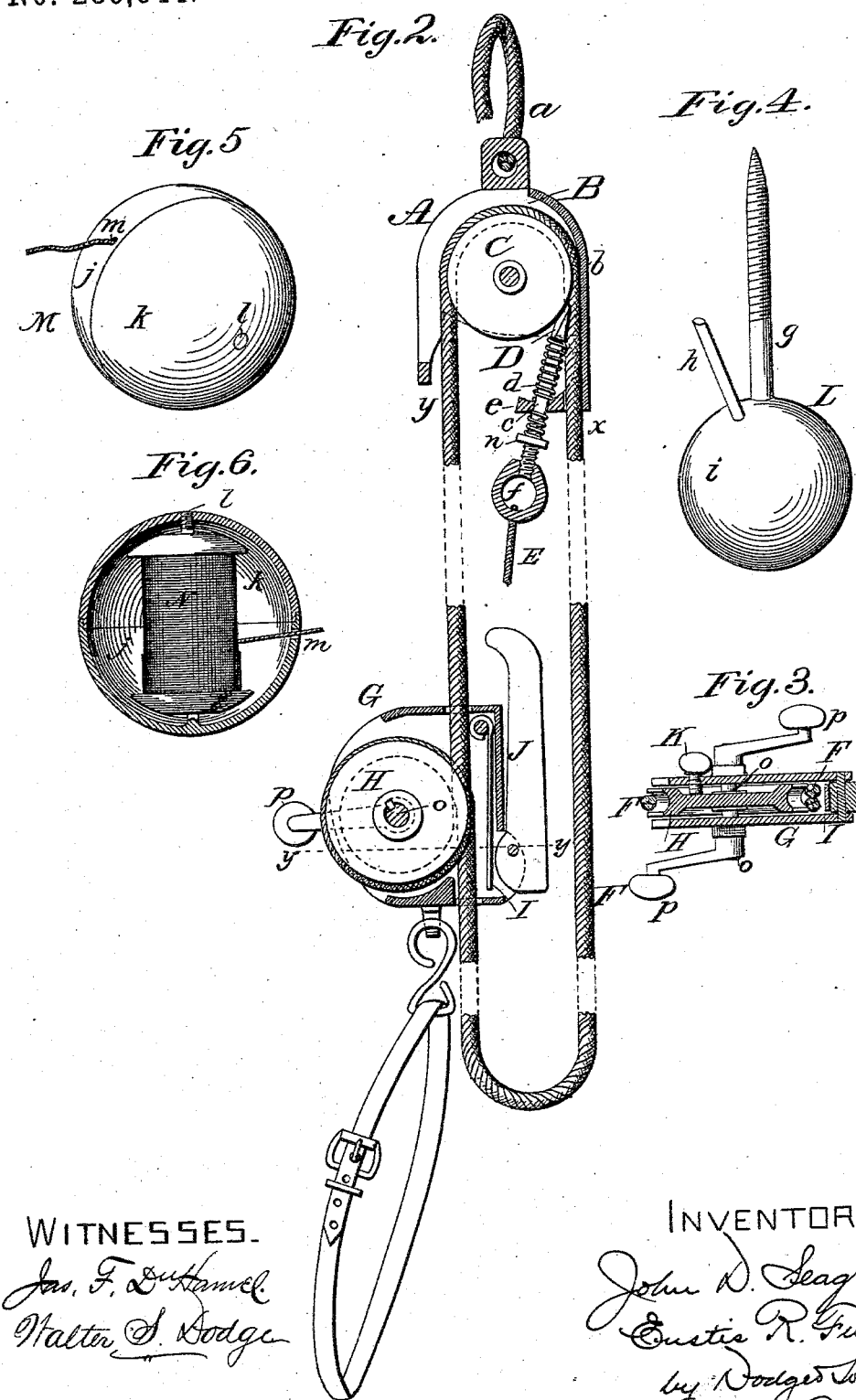

UNITED STATES PATENT OFFICE.

JOHN D. SEAGRAVE AND EUSTIS R. FULLER, OF WORCESTER, MASS.

FIRE-ESCAPE.

SPECIFICATION forming part of Letters Patent No. 286,644, dated October 16, 1883.

Application filed February 23, 1883. (No model.)

*To all whom it may concern:*

Be it known that we, JOHN D. SEAGRAVE and EUSTIS R. FULLER, of Worcester, in the county of Worcester and State of Massachusetts, have invented certain Improvements in Fire-Escapes, of which the following is a specification.

Our invention relates to fire-escapes; and it consists in a pulley-block adapted to be secured or attached to a window-casing, cornice, or other like place, and provided with a brake or rope clamp, an endless rope passing through said block, and a second pulley-block, likewise provided with a brake or clamp, and adapted to travel either with or upon the endless rope.

The invention further consists in devices for raising the escape to any desired point from the ground, and for suspending the same in position.

In the accompanying drawings, Figure 1 represents our escape in use. Fig. 2 is an enlarged view of the parts shown in Fig. 1, partly in section; Fig. 3, a section on the line $yy$ of Fig. 2; Fig. 4, a perspective view of the hanger or support; Figs. 5 and 6, respectively, perspective and sectional views of a ball or shell containing a reel, and designed for use in carrying a line to a window or over a roof or projection, for the purpose of raising the escape to any desired point.

Hitherto escapes have been made in a great variety of forms, and in some cases an upper pulley-block, an endless rope, and a sliding pulley-block provided with a brake, have been employed; hence we would here state that we do not broadly claim these parts of this combination. Under our construction, however, the apparatus is rendered capable of perfect control, both by persons descending or ascending, and by persons on the ground below, so that grown persons having sufficient self-possession to manage the apparatus for themselves can do so, while for those lacking such self-possession or the requisite knowledge may be aided in using it by persons below. Great trouble and difficulty has also been found heretofore, in many cases, in placing such escapes within reach of those needing them, and in finding a means of suspending them when furnished.

We will now explain how we secure the complete control of the device, and will then point out the manner in which we overcome the difficulties mentioned.

In the drawings, A represents a pulley-block, having, preferably, a metal shell or sheath, B, provided at the top with a loop or ring, $a$, by which to hang or suspend it.

C represents the pulley of block A, and D a brake, made in the form of a wedge, to enter between the pulley C and the rope or cable, and serving to crowd the latter over against the closed side $b$ of the shell, and thereby to produce sufficient friction or binding to hold the rope from moving upward on that side of the pulley on which the brake is arranged. The brake D has a stem, $c$, which is encircled by a spring, $d$, and passes through an inwardly-extending arm, $e$, formed on the shell or casing B, to guide and sustain said stem. The lower end of the stem $c$ is provided with an eye, $f$, to which a cord or light rope, E, is attached, whence said cord or rope passes to the ground, to enable persons there to control brake D. The rope or cable F can freely pass downward on the side where brake D is arranged, because in such case the brake is moved down by the rope; but the reverse movement is prevented, except when the brake is drawn down by cord E, as stated. Any suitable basket, carrier, strap, or like device being now applied to the rope F on the side away from the brake, (designated by letter $y$,) a person may, by getting into such carrier and drawing down upon the side of rope F which passes over brake D, (designated by letter $z$,) hoist himself or be hoisted to any desired point up to the block A, and the brake D, being left to act without disturbance, will hold the carrier at any desired point or at whatever point it is raised to. When it is desired to descend, the cord E is pulled to withdraw the brake D, and this may be done with such care as to permit the rope to travel but slowly; or it may be entirely withdrawn, in which case the descent would be regulated by holding back the ascending side of the rope, more or less, as required. In order, however, to render the apparatus more complete and efficient, we provide a sliding or traveling pulley-block, G, which we place upon the rope F, passing the latter once around the pulley H, the basket or carrier being attached to said block. The sliding block G is furnished with a clamping device or brake, consisting of a pivoted or hinged tongue or plate, I, arranged within the shell or block, and an eccentric-lever, J, arranged to bear upon said tongue, which in turn bears upon the rope F, pressing it against the pulley H with force sufficient to entirely prevent the movement of the rope or the pulley, or to regulate the movement as found necessary. This second block enables a person to first raise himself by the rope F to any desired point, as explained, then permitting brake D to lock the rope to descend at any desired rate by regulating the pressure of lever J. The device is thus quite useful for other purposes—such as painting or working on the walls or faces of buildings—and to still further adapt it to such uses and also to enable parties to work more efficiently in assisting persons out of windows, &c., we provide the shell G with a thumb-screw, K, which can be turned or screwed in to bear against pulley H and to hold said pulley against rotation. Any form of basket, belt, or carrier may be used.

For the purpose of affording a ready means of suspending the escape without the aid of tools or special implements, we provide a hook or hanger, L, consisting of a large screw-stem, $g$, a pin or hook, $h$, and a heavy ball, $i$, the screw-stem being gimlet-pointed, and the ball sufficiently heavy to enable a person, by taking the ball in his hand and striking the point of the screw into a window frame, casing, or cornice, to start the screw sufficiently to cause it to force its way in when turned by hand. This gives a ready means of suspending the block A, its loop $a$ being passed over the hook or pin $h$, which may then be carried close up to the wood-work by turning the screw-stem, thus preventing the accidental escape of loop $a$.

It often happens in case of fire that persons are cut off from the exits by the flames or smoke, in which case it has often been found impossible to give to the persons so cut off any means of escape.

To enable the escape to be carried up to any part of a building readily and without the use of ladders, we provide a case or shell, M, consisting of two hollow hemispheres, $j$ $k$, having their adjoining edges adapted to fit one over the other, and united by a central stem, $l$, threaded at one end to permit the hemisphere $k$ to screw onto it, the opposite end being made fast in the other part.

N represents a spool, which is placed upon the stem $l$, and rotates freely thereon, said spool being wound with stout twine, or with strong but pliable wire or wire cord, one end of which is made fast to the spool, while the other end passes through an opening, $m$, formed in the casing.

When it is desired to use the device, the end of the cord or wire is firmly held in one hand, and the ball is thrown to a window or over a projection or roof, and being seized by a person in the room, or falling to the ground after passing over a roof or projection, the wire or cord serves to draw up the rope F, by which a person may next ascend, and being at the desired point he may properly suspend the escape.

In order that the brake D of the block A may be thrown or held out of action when desirable so to do, its stem $c$ is provided with a nut, $n$, by which the upward movement of the brake may be so far limited as to prevent it from acting or wedging between the rope and pulley.

In some cases, and probably in most cases, it will be found desirable to extend the axle $o$ of the pulley or sheave H outward on each side of the block, and to provide said axle with hand-cranks $p$, which may be used to let the block down gradually, the clamp or binding-screw being in such case used merely to hold the block at any desired point.

We are aware that it is not broadly new to construct a pulley-block with a brake or clamping device which will permit the rope or cable to pass freely through in one direction, but prevent its movement in the reverse direction; and we are also aware that brakes have been applied to the pulley at the top of a fire-escape or hoisting apparatus and arranged to be operated by a cord from the ground.

Having thus described our invention, what we claim is—

1. The herein-described fire-escape, consisting of pulley-block A, provided with brake D, sliding block G, provided with a brake or clamp, and rope or cable F, passing through both blocks, substantially as described.

2. In a fire-escape, a pulley-block provided with a brake which permits the rope to run freely in one direction, but prevents it from running in the other direction until the brake is withrawn, and a cord extending from the brake to or nearly to the ground, adapted to withdraw the brake.

3. In a fire-escape, the combination of a fixed pulley-block, a rope passing through said block, and a wedge or brake adapted and arranged to enter between the rope and pulley and to force the rope against the shell or the block, substantially as explained.

4. In combination with pulley-block A, having closed side $b$, and with rope F, passing through said block, the wedge D, having stem $c$, and the spring $d$, encircling said stem and serving to force the wedge between the pulley and the rope.

5. In combination with block G, provided with pulley H, set-screw K, adapted to bear directly on the pulley, and rope or cable F, passing through the block and around the pulley, as set forth.

6. The hanger or hook for suspending the fire-escape, consisting of screw-stem $g$, pin $h$, and ball $i$, all substantially as shown.

7. The herein-described fire-escape-line carrier, consisting of separable shell M, carrying spool N, said spool being furnished with cord or wire, as and for the purpose set forth.

8. The herein-described line-carrier, consisting of hemispheres $j$ $k$, stem $l$, and spool N, provided with cord or wire, one end of said cord or wire being attached to the spool and the other end passing through and outside of the shell, as shown.

9. In combination with a pulley-block, a brake, D, constructed substantially as shown and described, and provided with a nut, n, on the brake-stem, whereby it may be drawn back and held out of action.

JOHN D. SEAGRAVE.
EUSTIS R. FULLER.

Witnesses:
 FRED HUBBARD,
 THOS. H. HAYFORD.